Feb. 4, 1936.  S. Q. BENNETT  2,029,907
WEIGHING SCALE
Filed Feb. 15, 1933   2 Sheets-Sheet 2
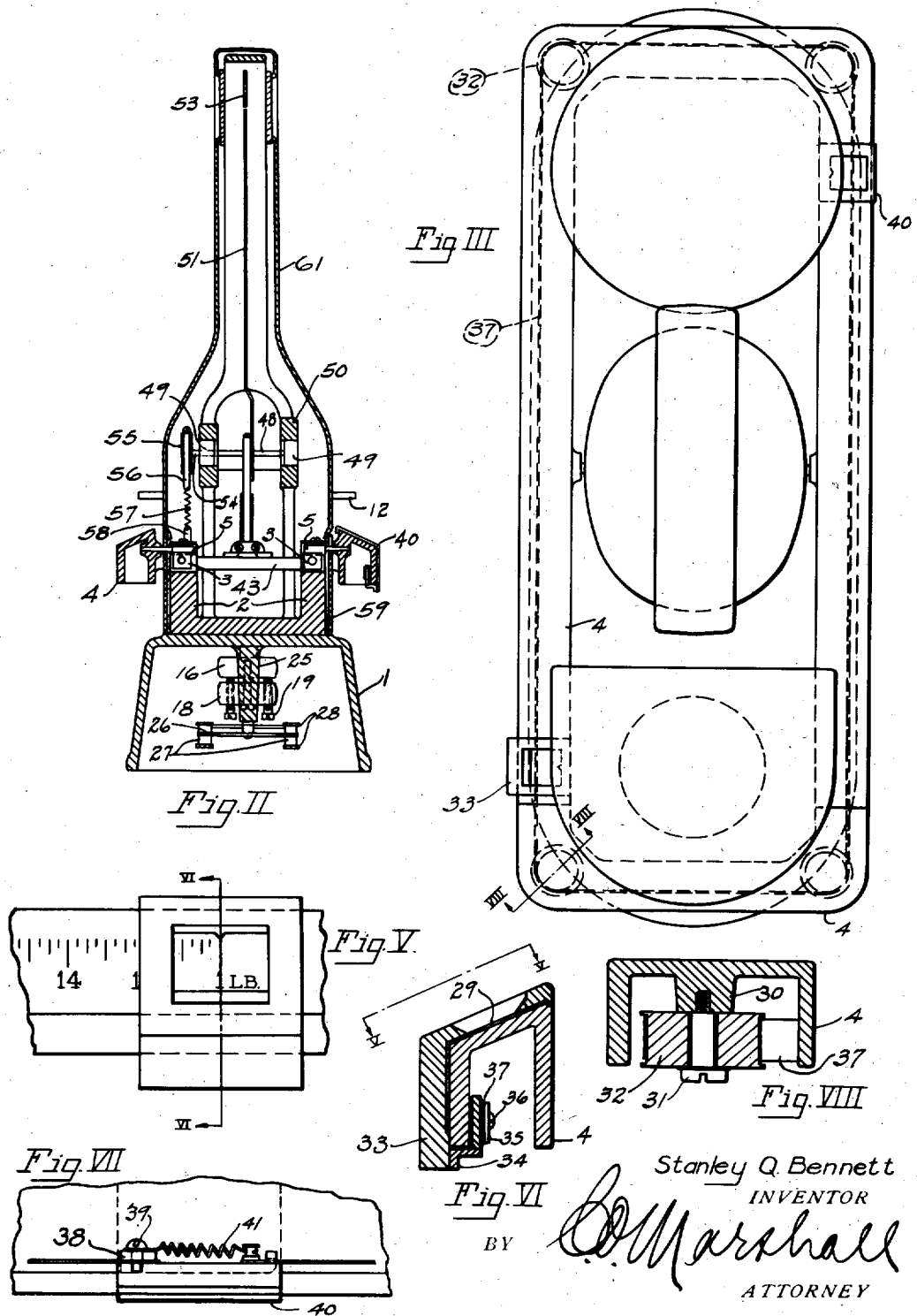
Stanley Q. Bennett
INVENTOR
BY
ATTORNEY Patented Feb. 4, 1936

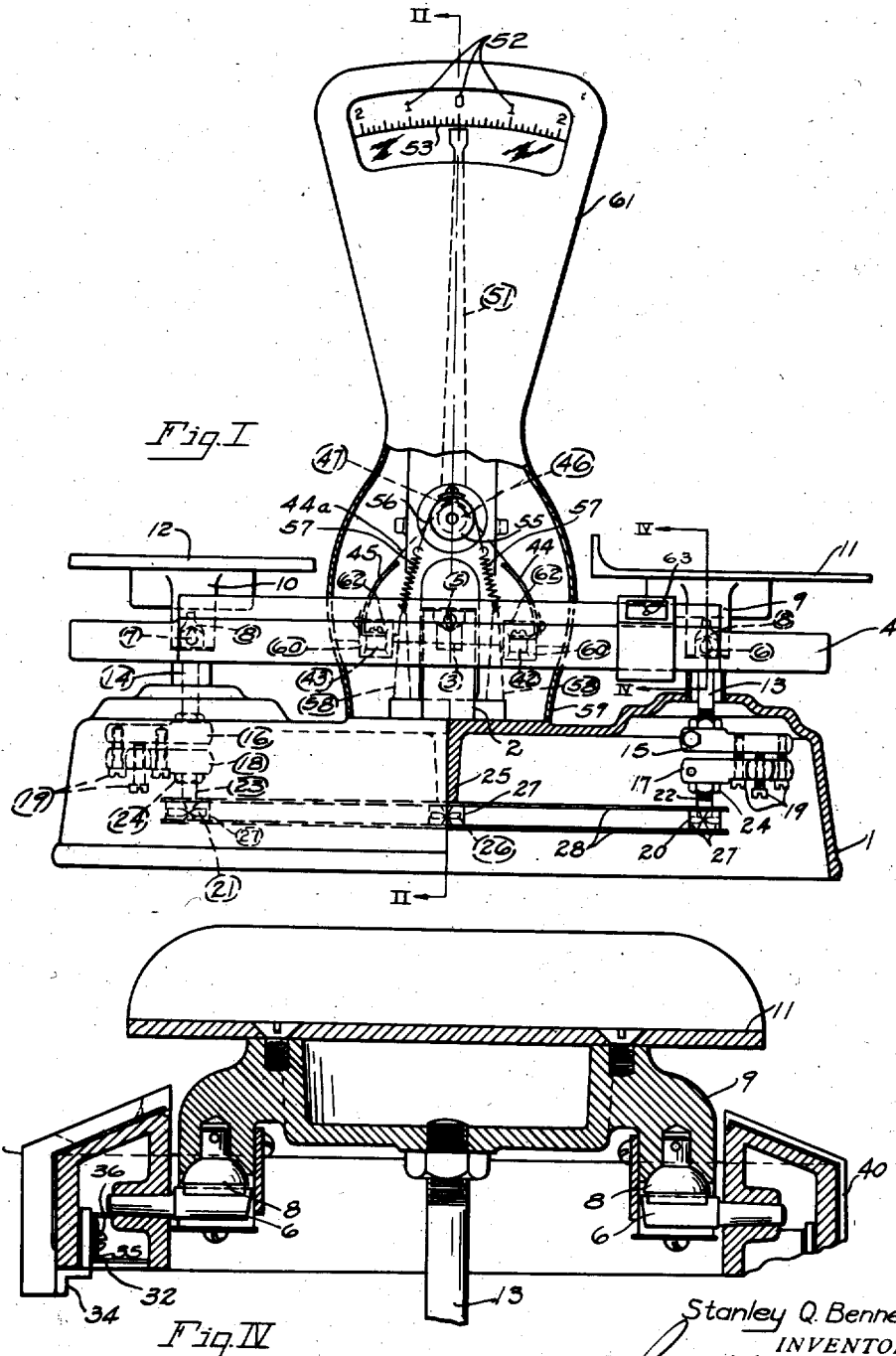

2,029,907

UNITED STATES PATENT OFFICE 2,029,907

WEIGHING SCALE

Stanley Q. Bennett, Toledo, Ohio, assignor to Toledo Scale Manufacturing Company, Toledo, Ohio, a corporation of New Jersey Application February 15, 1933, Serial No. 656,876

4 Claims. (Cl. 265—59)

This invention relates to weighing scales and more particularly to scales which are adapted to determine the weight of load and to indicate increments of weight which are over or under the predetermined amount.

One of the principal objects of my invention is the provision of improved means whereby an indicator, mounted independently of the scale lever or beam is adapted to multiply the movement of said scale beam.

Another object is the provision of improved means in an even balance scale of the Roberval type wherein unbalanced increments of load are counterbalanced by means cooperating with an indicator which is mounted independently of the main beam.

Still another object of the invention is the provision of improved means whereby the position of the indicator, relative to a given point on the scale chart, is not changed when the scale is moved into an unlevel position.

Still another object is the provision of improved means whereby loads, such as the tare weight of a container may be counterbalanced conveniently by the movement of a slidably mounted poise.

A further object is the provision of means whereby the amount of the load counterbalanced by the poise is simultaneously indicated on the back of the scale.

Another object is the provision of a scale of the predetermined weight type which is sturdy in construction and simple and comparatively inexpensive to manufacture.

These and other objects and advantages will be apparent from the following description wherein reference is had to the accompanying drawings, and wherein similar reference numerals refer to similar parts throughout the several views.

In the drawings:

Figure I is a front elevational view of a scale embodying the invention; parts being broken away to show some of the parts more clearly.

Figure II is a cross sectional view thereof, parts being omitted to more clearly show the essential parts; the section is taken substantially along the line II—II of Figure I.

Figure III is an enlarged plan view of the scale.

Figure IV is a cross sectional view through the load supporting lever and the commodity platter substantially along the line IV—IV of Figure I.

Figure V is a front elevational view of the tare poise and a fragment of the cooperating indicia bearing member, viewed substantially from a position along the line V—V of Figure VI.

Figure VI is a cross sectional view through the main lever and the tare poise sectioned along the line VI—VI of Figure V.

Figure VII is a fragmentary view, seen from below, of the poise position indicator; and Figure VIII is a cross sectional view through the main lever along the line VIII—VIII of Figure III showing in detail the guide roller and the metallic tape.

Referring to the drawings in detail a base 1 preferably a rigid iron casting is provided with two upstanding brackets or base horns 2 which have hardened bearings 3 fixed in their ends, upon which a load supporting lever 4 is oscillatably mounted with its fulcrum pivots 5. The lever 4 is of the first order and adjacent its ends is provided with pairs of pivots 6 and 7 upon which rest bearings 8 alignably fixed in furcations of supporting spiders 9 and 10 respectively. The spider 9 supports a load platter 11 upon which the material, whose weight is to be determined is placed, while upon the spider 10, a platter 12 is fastened for the reception of counterpoise weights. Downwardly extending stems 13 and 14 are studded into the spiders 9 and 10. These stems project, through apertures, into the interior of the hollow base 1, and are threaded into horizontally extending plates 15 and 16 which, with plates 17, 18 and a plurality of screws 19, form a universal adjustment means for check link pivots 20 and 21, riveted to short stems 22 and 23 which are threaded into the plates 17 and 18, these are securely locked against disengagement by lock nuts 24. In the plane passing through the fulcrum pivot 5 and located in the interior of the base 1 is a downwardly extending fixed post 25 to which another check link pivot 26 is fastened. Each of these check link pivots (20—21—26) have a pair of colinear, opposed knife edges which are engaged by suitable bearings 27 held between check link plates 28. These check links maintain the condition of level of the platters 11 and 12 in the well known manner which, since it is so widely understood, is not more fully described herein.

The lever 4 has a substantially rectangular shape. Reference to Figures III and IV will disclose the fact that the pivots 5, 6 and 7 are fixed therein, so that they extend into the open center. The arms which form the rectangle have a substantially U section (see Figure VIII) the long arms both front and back of the lever have portions which are extended upwardly, and have a cross section which is clearly shown in Figure IV. Sloping top faces 29 of these portions have a series of weight divisions and designating numerals engraved or stamped thereon. Within the U of this section, which is continuous, are a number of bosses, extending from the inner wall provided with conical apertures into which tapered tenons of the pivots 5, 6 and 7 are driven. Each of the four corners of the lever 4 is provided with a downwardly extending boss 30 into which a screw 31 is threaded which retains a flanged roller 32. A poise 33 whose shape substantially conforms to the contour of the aforementioned portions of the lever is slidably mounted thereon having a bracket like member 34 fastened to it, which extends into the U of the beam arm and is clamped by a plate 35 and a screw 36 to a flexible metallic ribbon 37. This ribbon engages the four rollers 32 located in the four corners of the lever, and is held in position by the flanges of the rollers. One end of this ribbon is clamped by means of small plate 38 and screw 39 to an index 40 made from thin, light material and slidably mounted on the rear arm of the lever 4 for cooperation with a series of weight indicia (see Figure VII). The other end of this ribbon passes through a slit whose width is equal to the thickness of the ribbon in a portion of the index 40 and a stud riveted to the ribbon is engaged by a spring 41 whose other end is clamped by the screw 39. This arrangement assures a uniform tension of the ribbon at all times and permits the poise 33 to be moved along the beam, the index 40 is thereby simultaneously moved an equal distance on the other arm of the lever, but in the opposite direction, to indicate the amount of weight offset by the poise on the back of the scale, since the poise and index are both fastened directly to the ribbon which in effect is an endless belt.

Two transverse bars 42 and 43 connect the long arms of the lever 4, one on each side of the fulcrum pivot 5 and equi-distantly spaced therefrom. Rigid members 44 and 45 are fastened to the bars 42 and 43 respectively, these have arcuate faces whose radii are struck from the turning axis of the fulcrum pivot. The ends of a ribbon 44a which passes over a cylindrical member 46, to which it is fastened by a screw 47, are secured to the lower portions of the rigid members 44 and 45 by clamping plates and screws. The cylindrical member 46 is firmly held, by means which are not more particularly described, on an axle 48 which is resting in antifriction bearings 49 stationed in a rigid frame 50 arising from the base 1, to which it is fastened.

For the purpose of indicating the condition of balance of the weighing device an indicator 51 is secured to the cylindrical member 46 and which, projecting upwardly cooperates with indicia 52 printed on a chart 53 secured to the upper portion of the frame 50. The axle 48 has an extension 54 projecting through one of the anti-friction bearings 49 on which a second cylindrical member 55 is fastened. A metallic ribbon 56 passes over the upper portion of this cylindrical member to which it is fastened by a suitable clamp and screw and each of its ends has an aperture which is engaged by a helical spring 57. The lower ends of these springs engage apertures in upwardly extending studs 58 which arise from the base plate of the frame 50. To enclose and properly protect the indicating and counterbalancing mechanism which is supported by the frame 50, a housing comprising a lower and upper section is provided, the lower section 59 is fastened to the base 1, the upper edge thereof, which lies in a horizontal plane is provided with two cut out portions 60 which are so located that the transversely extending bars 42 and 43 of the lever 4 are disposed therein. An upper section 61 of this housing is substantially fan shaped and has an enlarged bottom portion which rests upon the upper edge of the lower section 59. Suitable clamping means, not particularly described herein, are provided to fasten these two sections together. The lower edge of the upper section of the housing 61 has similar cut out portions 62 which register with the openings 60 so that when the lever 4 is oscillated on its fulcrum, the bars 42 and 43 extend freely through the housing.

The mode of operation of the device should be apparent from the foregoing description but to obviate any misunderstandings which might arise, the following example of a typical weighment is given. Assuming that it is desired to fill a number of packages with two pounds of material, the empty package is first placed upon the platter 11. The poise 33 whose index in its normal position points to a zero indicium 63 of the series of indicia marked on the front arm of the lever 4 is moved towards the left until the indicator 51 which was moved, due to the weight of the package, again points to the zero of the series of indicia 52 on the chart 53. Since the index 40 on the rear arm of the lever 4 is connected to the poise 33 by the flexible metallic ribbon 37 which passes over the rollers 32 in each corner of the lever, it is moved a similar distance and indicates the position of the poise 33 on the other side of the scale and thus the weight of the empty package is indicated on both sides of the scale. A two-pound weight is now placed upon the platter 12. This overbalances the lever 4 and the cylindrical member 46 with the indicator 51 which is connected thereto is caused to rotate in an anti-clockwise direction by the ribbon 44a which overlies the cylindrical member 46 and the arcuate surfaces of the members 44 and 45 fastened to the transverse arms 42 and 43. This causes one of the helical springs 57 which engages an end of the ribbon 56 secured to the second cylindrical member 55 to be stretched and the other spring 57 engaging the other end of the ribbon to contract so that unbalanced forces exists in the two springs. Material is now poured into the package standing upon the platter 11 and this increasing load is gradually offsetting the weight of the counterpoise which rests on the platter 12. The indicator will now move in a clockwise direction over the chart 53 and due to the action of the springs 57 in a manner which is well known and requires no further explanation, points to the indicium representing the amount which the load is still deficient of the predetermined two pounds. Further addition of material will bring the indicator 51 into registry with the zero indicia, at this point the load on the platter 11 exactly counterbalances the counterpoise weight on the platter 12.

Similarly overweight is instantly detected as the indicator will then move to the right of the zero indicium on the chart 53. It is well known that the parts of an even balance scale of the type herein described, when all parts are statically balanced, will not change their relative positions when the scale is placed in an unlevel position. The indicator, when fulcrumed independently of the beam, however, has a tendency to change its relative position. This, however, is obviated in the present invention by the springs 57 which exert equal but opposite forces thereon, holding it from moving relatively to the other scale mechanism thus the scale with no loads on the platform will remain in equilibrium and the indicator in registration with the zero indicium when placed in an unlevel position and also weigh loads accurately when in such position.

The particular construction of a balance shown and described herein is a preferred embodiment well adapted to fulfill the objects primarily stated. It is to be understood, however, that the invention is susceptible to variation, modification and change within the spirit and scope of the sub-joined claims.

Having described my invention, I claim:

1. In a device of the class described, in combination, weighing mechanism including a load supporting lever, said lever having two parallelly extending arms marked with like indicia, cross sections of said arms being substantially U shaped, a load offsetting poise mounted upon one of the said arms and having an index cooperating with the indicia of said arm, an index mounted upon the other of said arms and cooperating with the indicia thereof, said index being light in weight as compared to said poise and means lying within said U whereby equal but opposite movement is imparted to said index.

2. In a device of the class described, in combination, a base, load receiving mechanism mounted upon said base, load counterbalancing mechanism operatively connected thereto, load indicating means actuated thereby, said load receiving mechanism including a substantially rectangular lever, arms forming said lever having a substantially U shaped cross section, a series of indicia and designating numbers marked upon each of said arms, a load offsetting poise slidably mounted upon one of said arms, an index mounted upon the other of said arms said index being light in weight compared to said poise, said poise and said index cooperating with said series of indicia to indicate the amount of load offset by said poise, a roller fixed at each corner of said rectangular lever within said U shaped cross section, flexible means engaging and overlying portions of said rollers and connected to said load offsetting poise and said index whereby equal movement is imparted to said index when said poise is moved.

3. In a device of the class described, in combination, a weighing scale comprising a lever of the first order, load receiving and counterpoise platters mounted thereon, a frame supporting indicating means mounted upon said base, said indicating means cooperating with said lever to indicate the condition of balance, non-resilient actuating means interposed between said lever and said indicating means and resilient means having auxiliary counterbalancing effect between said indicating means and said base, said non-resilient means comprising a plurality of members having arcuate faces secured to said lever, a cylindrical member secured to said indicating means, a metallic ribbon overlying and secured to said arcuate faces of said members and said cylindrical member, and said resilient means comprising a second cylindrical member operatively connected to said indicating means and oppositely disposed springs engaging said second cylindrical member and said base.

4. In a device of the class described, in combination, a frame, an even-balance type lever fulcrumed thereon, an indicator pivotally mounted on said frame, members secured to said lever and having arcuate faces curved about the fulcrum axis thereof, a member fixed to said indicator and having an arcuate face curved about the pivot thereof, flexible ribbons connected to said arcuate members secured to said lever and fixed to said indicator and overlying the arcuate faces thereof, a pair of springs secured to said frame, flexible means connected to said springs, and means for oppositely connecting said springs to said indicator to pull tangentially on invariable radii.

STANLEY Q. BENNETT.